Nov. 2, 1926.  L. J. LEON  1,605,248

BIRDCAGE

Original Filed June 23, 1924

Inventor,
L. J. Leon,

Patented Nov. 2, 1926.

1,605,248

UNITED STATES PATENT OFFICE.

LEWICKI J. LEON, OF CHICAGO, ILLINOIS.

BIRDCAGE.

Original application filed June 23, 1924, Serial No. 721,678. Divided and this application filed January 23, 1925. Serial No. 4,142.

This invention relates to bird cages, and has for its object an improved form of detachable connection between the body of the cage and the base without the use of pivoted or sliding catches, as heretofore.

Figure 1:
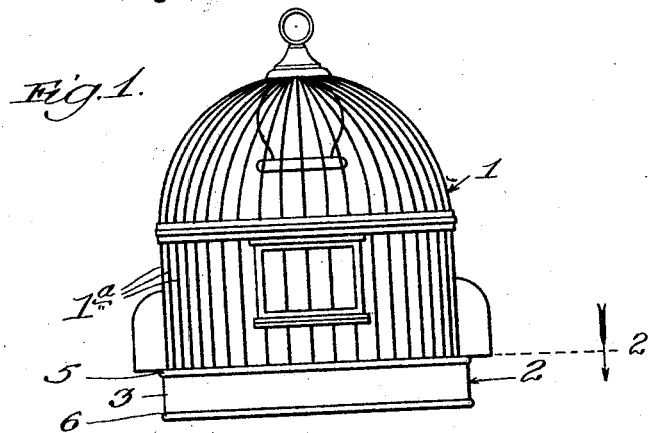
Fig. 1 is a side view of a bird cage embodying the features of my invention.

As illustrated in Fig. 1, the cage comprises a body 1 and a base 2, both circular in form and with the top of the cage body dome shape as shown.

The base 2 is formed to have an upright marginal wall 3 and a flat bottom wall 4 integrally connected together so that said walls are fixed or permanently joined against separation. As shown, the marginal wall 3 is provided at or adjacent its upper edge with a surrounding bead 5 forming an inwardly opening channel to receive a number of lugs or projections 6 carried by the bottom ring 7 of the cage body 1.

Figure 2:
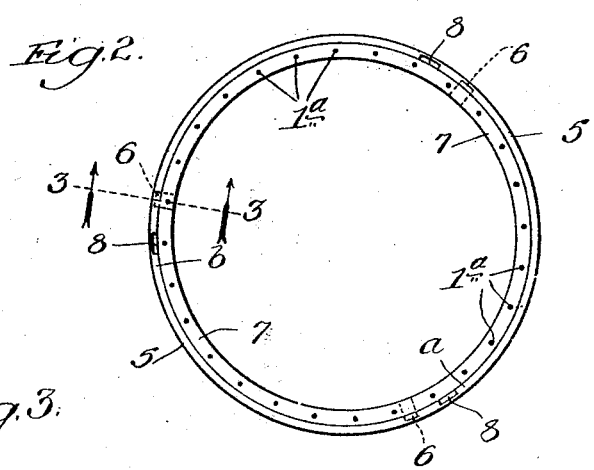
Fig. 2 is an enlarged horizontal sectional view taken through the cage body just above the base on line 2—2 of Fig. 1.
Figures 3, 4, 5:
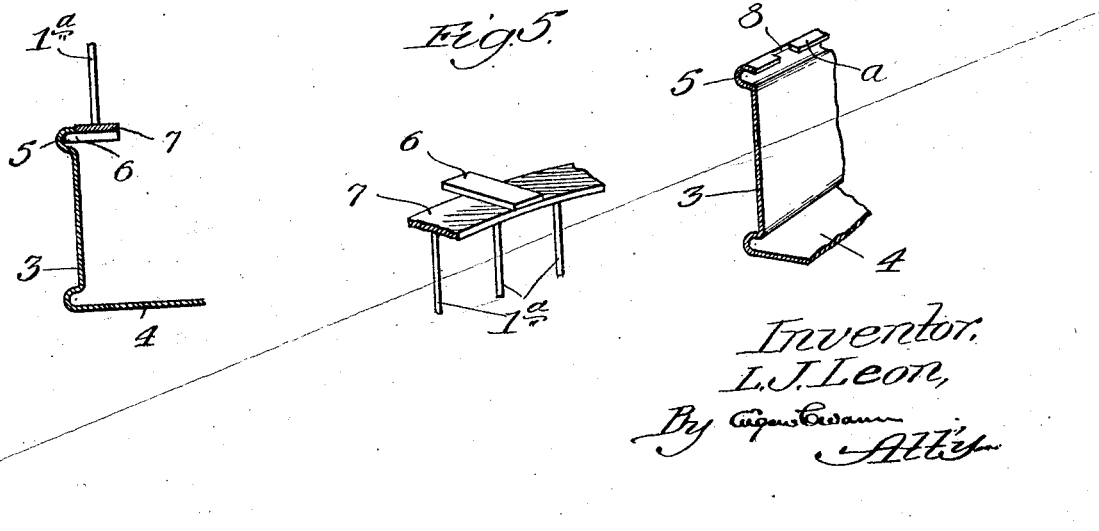
Fig. 3 is an enlarged vertical sectional view taken on line 3—3 of Fig. 2.
Fig. 4 is a perspective sectional view to show one of the notches in the upper channel of the upright wall.
Fig. 5 is a bottom plan view of a part of the base ring of the cage body to show one of the fastening lugs.

These projections 6 extend outward beyond the ring 7 so as to enter the channel formed by the bead 5 and connect the cage body and base together. The upper flange $a$ of this channel is provided with a plurality of notches 8 spaced about the base in the same manner as the projections 6, so that when in register the cage body and base may be separated by moving them axially apart. On passing the projections 6 back through the notches 8 and turning the base and cage body relatively to each other so as to bring the projections in the channel beyond the notches, the cage body and base are connected together, as shown in Fig. 2.

The structure shown and described permits making the base 2 either of metal or a non-metallic material, such as pyroxylin, celluloid, or the like. This material is light in weight and is furnished commercially in varied colors, and therefore allows the making of bases of different colors to harmonize with the color scheme of the cages. By merely turning the base and cage body relatively to each other until the lugs and slots register, the base 2 may be completely removed from the cage body without the necessity of operating independently a number of pivoted or other catch members around the cage body, as heretofore, thus enabling the cage body and base to be readily connected and disconnected.

The wires $1^a$ of the cage body are connected with and terminate at the base ring 7, as shown.

This application is a division of my prior application filed June 23, 1924, Serial No. 721,678.

I claim as my invention:

1. A bird cage, comprising a cage body and a base, the latter having marginal and bottom walls, and means providing a releasable connection between the lower edge of the cage body and the upper edge of said marginal wall, said means including projections and a channel at said edges with the projections on one part to enter the channel on the other part, with notches in the channel for the projections to pass through when in register.

2. A bird cage, comprising a cage body and a base, the latter having marginal and bottom walls with an inwardly opening channel about the upper edge of the marginal wall, projections carried by said cage body at its lower end to enter the channel and connect the base and cage body together, said channel having notches for the release of the base from the cage body on turning one with respect to the other to bring the notches and projections in register.

In testimony that I claim the foregoing as my invention, I affix my signature, this 20th day of January, 1925.

LEWICKI J. LEON.